United States Patent [19]
Choi et al.

[11] Patent Number: 5,569,738
[45] Date of Patent: Oct. 29, 1996

[54] MELT PROCESSABLE ETHERIMIDEIMIDE/ETHERIMIDE COPOLYMER

[75] Inventors: Kil Y. Choi; Jong C. Won; Young T. Hong, all of Taejeon; Sang S. Woo; Youn S. Don, both of Seoul, all of Rep. of Korea

[73] Assignees: Korea Research Institute of Chemical Technology; Cheil Industries, Inc., both of Rep. of Korea

[21] Appl. No.: 403,315

[22] Filed: Mar. 14, 1995

Related U.S. Application Data

[63] Continuation-in-part of Ser. No. 193,126, May 17, 1994, abandoned.

[51] Int. Cl.$^6$ .............. C08G 73/10; C08G 69/26
[52] U.S. Cl. .......... 528/170; 528/125; 528/128; 528/173; 528/174; 528/176; 528/179; 528/188; 528/189; 528/220; 528/229; 528/353
[58] Field of Search ............... 528/353, 170, 528/125, 128, 173, 174, 176, 179, 188, 189, 220, 229

[56] References Cited

U.S. PATENT DOCUMENTS 5,212,277   5/1993   Lee et al. .................. 528/170
5,260,404  11/1993   Whiteley et al. ............ 528/125

*Primary Examiner*—James J. Seidleck
*Assistant Examiner*—P. Hampton-Hightower
*Attorney, Agent, or Firm*—Kenyon & Kenyon

[57] ABSTRACT

This invention relates to melt processable copolymer of etherimideimide/etherimide herein-after identified as PEII/PEI copolymer of following structural formula(I).

wherein,
R and R' are independently selected from the groups of

Ar and Ar' are independently selected from the groups of (wherein,
R1 is H or C1–C6 alkyl group,
R2 is H or C1–C4 alkyl group, and
R3 is —O—, —CO—, —SO—, —SO2—.); and
n and m are independently an integer between 5 and 500.

4 Claims, 1 Drawing Sheet

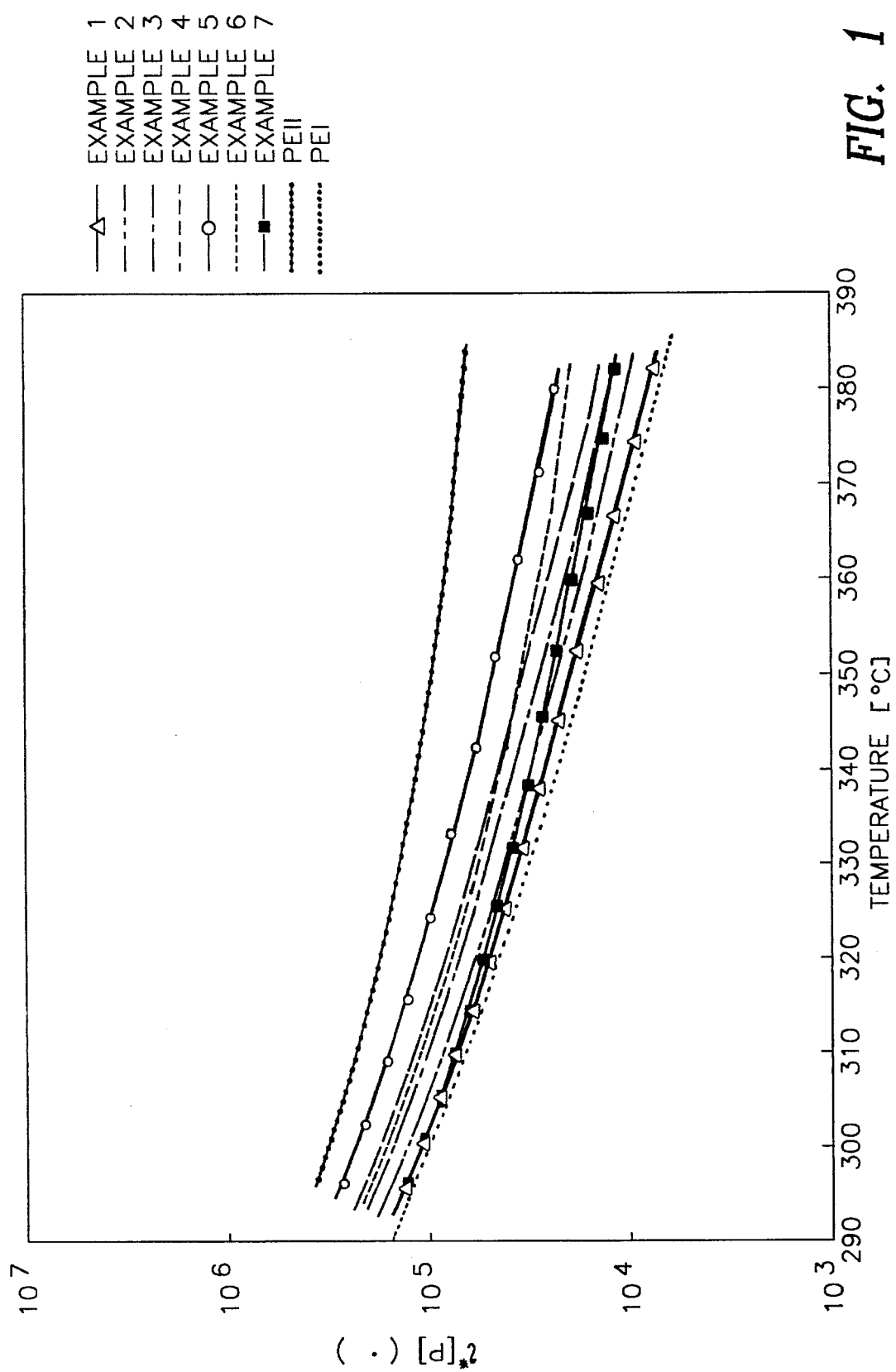

MELT PROCESSABLE ETHERIMIDEIMIDE/ETHERIMIDE COPOLYMER

This application is a continuation-in-part of Ser. No. 08/193,126, filed May 17, 1994, which is now abandoned.

BACKGROUND OF THE INVENTION

1. Field of the Invention

This invention relates to melt processable copolymer of etherimideimide/etherimide herein-after identified as PEII/PEI copolymer and the preparing method thereof, particularly preparing a copolymer having superior meltviscosity to polyetherimideimide of U.S. Pat. No. 5,212,277 by copolymerizing with a polyetherimide. Having a imideimide moiety, polyetherimideimide resin shows good heat resistance but due to its high melt viscosity should be treated melting wrought around at high temperature of 380° C.

But this melting wrought cause so much pyrolysis that special processing system is needed. In this respect polyetherimideimide resin have a weak point of high cost for its equipment.

Accordingly, the present inventors have conducted long term investigations and studies in order to prepare a etherimideimide/etherimide copolymer which have not only the characteristics of polyetherimideimide resin in prior arts but also highly improved meltviscosity and at last succeed to prepare a copolymer which have not only a preferable solubility and other physical properties but also good processability by improving the copolymerization process and copolymerizing with a polyetherimide.

The objection of this invention is preparing PEII/PEI copolymer of following formula (I).

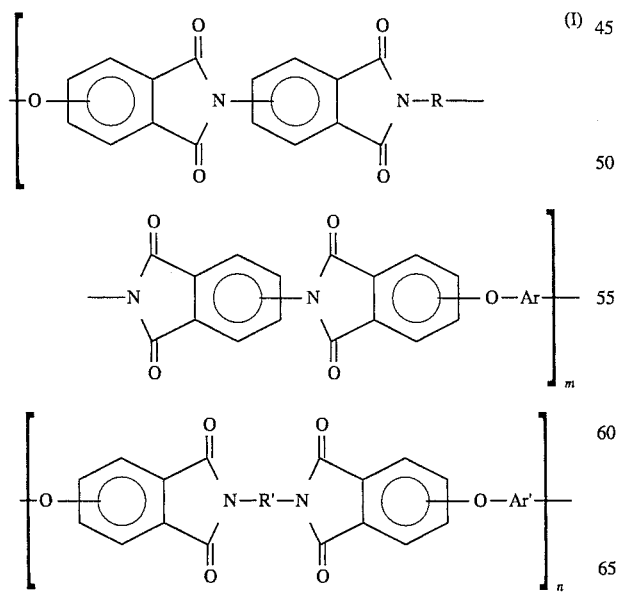

wherein,
R and R' are independently selected from the groups of

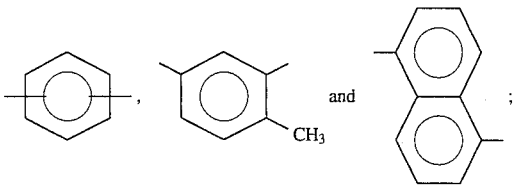

Ar and Ar' are independently selected from the following groups

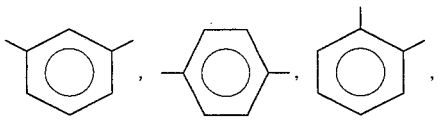

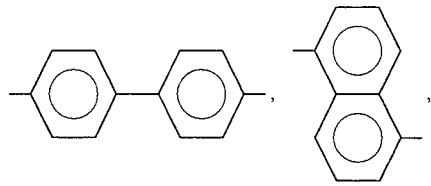

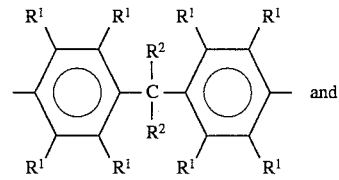

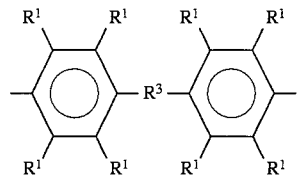

(wherein,
R1 is H or C1–C6 alkyl group,
R2 is H or C1–C4 alkyl group, and
R3 is —O—, —CO—, —SO—, —SO2—.); and
n and m are independently an integer between 5 and 500.

2. Description of the Related Art

Generally, engineering plastics have excellent thermomechanical properties under severe physical and chemical conditions for a long time, and thus they have been used as raw material for industrial accessories and structural housings in industrial fields such as electrics, electronics, precision instruments, etc.

Polyimide resin (hereinafter identified as PI) especially wholly aromatic PI, is one of the above engineering plastics, having excellent heat-resistance.

However, since wholly aromatic PI is very difficult to mold its molding product can be made by special molding methods such as compression or mechinary process of molding materials.

To improve the disadvantage of PI research has been made. Among them, the polyetherimide (hereinafter identified as PEI), which was first synthesized by General Electric Co. of USA in 1982, has come into the market in the trade name of ULTEM®.

PEI is a special engineering plastic having properties such as good mechanical stress, flame retardent, electric, chemical resistance, processability and heat-resistance.

A range of PEI application has extended to a wide range such as a basic materials for automobile, electrics, electronics, household electrical appliances, public transport such as airplane, fiber and film etc.

These inventor have developed and manufactured novel polyetherimideimide resin (hereinafter identified as PEII) as shown by U.S. Pat. No. 5,212,277.

PEII has additional imide group as compared to PEI which already consisting of phthalimide group and ether group.

PEII can be produced either melt or solution polymerization process and it exhibits equal or even superior thermal stability and mechanical properties to PEI.

Heat deflection temperature (hereinafter identified as HDT) of PEII is improved over 20° C. because glass transition temperature (hereinafter identified as Tg) has improved as compared with PEI.

Although Tg and HDT of PEII have remarkably improved than PEI, mechanical properties such as tensile strength have not improved significantly because the bulkiness of diamine interferes with the formation of higher molecular weight polymer.

Additionally, by the bond effect of imide-imide in the PEII, tensile strength is increased and cause high melt viscosity. As a result of continuous research, inventors succeed to invent copolymer having better thermal stability than PEI and lower melt viscosity than PEII, which is excellently improved in its processability.

SUMMARY OF THE INVENTION

The present invention relates to melt processable etherimideimide/etherimide copolymer having etherimideimide/etherimide group with following structural formula(I) and 0.67~0.84 dl/g of inherent viscosity[η inh].

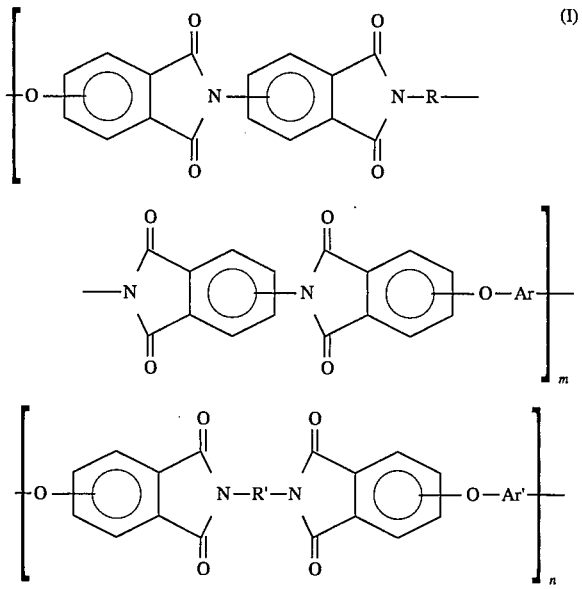

wherein, R, R', Ar, Ar', m and n are defined as the above, respectively.

And the noble etherimideimide/etherimide copolymers have glass transition temperature range of 224°~255° C. and melt viscosity of range according to composition ratio of copolymer is about 8.5×104~3.5×104 poise in frequency condition of 10-1 rad/sec at 330° C. Further to this, it can be easily processed in the injection moulding machine.

BRIEF DESCRIPTION OF THE DRAWING

FIG. 1 is graphs of melt viscosity according to the temperature for the etherimideimide/etherimide copolymers prepared by the present invention for comparison with that of polyetherimide (PEI) and polyetherimideimide (PEII).

DESCRIPTION OF THE PREFERRED EMBODIMENTS

According to the present invention, the PEII/PEI copolymer of above shown structural formula (I), can be prepared by mixing diamine having imide group of following formula (II) with m-phenylenediamine of following formula (III), and copolymerizing the obtained reactant with bis ether anhydride (hereinafter identified as BEA) of following formula (IV).

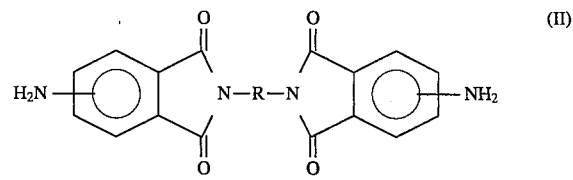

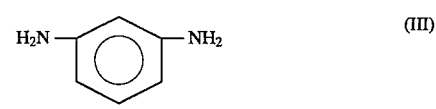

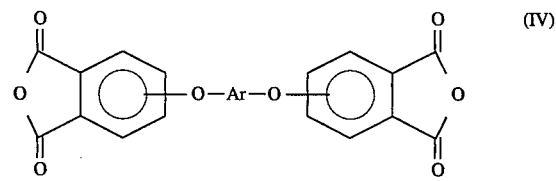

wherein, R and Ar are respectively defined as the above.

For synthesizing PEII/PEI copolymer, solution polymerization is carried out by dissolving monomers of the above formula (II), (III), and (IV) in the presence of mixed solvents such as N,N'-dimethylpropy urea and dimethylacetic acid, etc., at 150–250° C. And the PEII/PEI copolymer can be synthesized by melt polymerization method at 250°~350° C.

PEII/PEI copolymer of the above formula (I) obtained according to the present invention have the following properties.

PEII/PEI copolymer is soluble in chloroform, methylene chloride, m-cresol, N,N'-dimethylformamide, etc. thus, films can easily be casted from the above solvents. Initial decomposition occurs at 545°~560° C. and the Tg values of these polymer are in a temperature range from 224° to 255° C. The copolymers have 117~130N/mm2 of tensile strength, so application range is extended to be wide.

PEII/PEI copolymer resulting from this invention have good heat-resistance and low meltviscosity and is greatly improved in its processability enough to be processed by injection moulding using the well-known machines so it can be available as a engineering plastic has application to automobile, electrics, electronics, household electrical appliances, public transport such as airplane and fiber.

In order that those skilled in the art will be able to practice the invention, the present invention is illustrated by the following examples in detail. But the ranges of this invention are not limited to the below illustrated examples.

EXAMPLE 1

In four-necked flask fitted with a magnetic stirrer, a condenser and a thermometer was placed the following materials.

A mixture of 7.9 Parts of 2,2'-bis[4-(3,4-dicarboxyphenoxy)phenyl]propanedianhydride, (hereinafter identified as BEA), 0.6 parts of bis-4-aminophthalimidobenzene (hereinafter identified as B-4-APIB), 1.5 parts of m-phenylenediamine (hereinafter identified as m-PD) and 36.6 parts of of dimethylacetcamide (hereinafter identified as DMAc), 30.5 parts of N,N'-dimethylpropyl urea (hereinafter identified as DMPU) were added. The reaction mixture was heated under nitrogen atomsphere until the vessel temperature reached to 150° C.

After adding 22 parts of toluene, the water was continuously removed by azeotropic distillation using a dean-stark trap for one hour, and then toluene was completely distilled off.

Stirring was continued for two hours at 210° C., the temperature was again allowed to reach for two hours at 230° C. Using a vaccuum pump, the residual solvent was slowly removed for 1 hr at 250° C., 10 torr.

The copolymer(etherimideimide(EII):etherimide(EI)= 10:90) was obtaine by precipitation from methanol and dried for two hours in vaccum oven at 100° C.

The yield was quantitative and the inherent viscosity was found to be 0.84 dl/g by measuring with concentration of 0.5 g/dl at 30° C. in m-cresol.

Anal. Calcd: C,74.59; H,3.96; N,4.96. Found: C,73.82; H,4.00; N,4.87.

EXAMPLE 2

The general procedure of example 1 is repeated except that 7.9 parts of BEA, 1.8 parts of B-4-APIB and 1.1 parts of m-PD were used to obtain a copolymer(EII/EI=30:70). The yield was quantitative, the inherent viscosity was found to be 0.78 dl/g at 30° C. in m-cresol.

Anal. Calcd: C,73.87; H,3.80; N,5.36. Found: C,72.92; H,3.83; N,5.32.

EXAMPLE 3

The general procedure of example 1 is repeated except that 7.9 parts of BEA, 3.0 parts of B-4-APIB, and 0.8 parts of m-PD were used to obtain a copolymer(EII/EI (50:50).

The yield was quantitative and the inherent viscosity was found to be 0.73 dl/g by measuring with concentration of 0.5 g/dl at 30° C. in m-cresol.

Anal calcd: C,73.27; H,3.66; N,5.70. Found: C,72.69; H,3.59; N,5.52.

EXAMPLE 4

The general procedure of example 1 is repeated except that 7.9 parts of EEA, 4.2 parts of B-4-APIB and 0.5 parts of m-PD were used to obtain a copolymer(EII/EI (70:30).

The yield was quantitative and the inherent viscosity was found to be 0.76 dl/g by measuring with concentration of 0.5 g/dl at 30° C. in m-cresol.

Anal. Calcd: C,72.75: H,3.55; N,5.99. Found: C,72.32; H,3.52; N,5.91.

EXAMPLE 5

The general procedure of example 1 is repeated except that 7.9 parts of BEA, 5.4 parts of B-4-APIB and $1.7 \times 10^{-1}$ parts of m-PD were used to obtain a copolymer(EII/EI (90:10)).

The yield was quantitative and the inherent viscosity was found to be 0.70 dl/g by measuring with concentration of 0.5 g/dl at 30° C. in m-cresol.

Anal. Calcd: C,72.31: H,3.45; N,6.24. Found: C,71.20; H,3.46; N,6.17.

EXAMPLE 6

The general procedure of example 1 is repeated except that 7.9 parts of BEA, 3.02 parts of B-4-APIB and 1.52 parts of 4,4'-diaminodiphenylether (ODA) were used to obtain a copolymer(EII/EI-6 (50:50)).

The yield was quantitative and the inherent viscosity was found to be 0.67 dl/g by measuring with concentration of 0.5 g/dl at 30° C. in m-cresol.

Anal. Calcd: C,73.56: H,3.70; N,5.36. Found: C,73.49; H,3.69; N,5.27.

EXAMPLE 7

The general procedure of example 1 is repeated except that 7.9 parts of BEA, 3.02 parts of B-4-APIB and 1.2 parts of 1.5-naphthalenediamine were used to obtain a copolymer(EII/EI-7 (50.50)).

The yield was quantitative and the inherent viscosity was found to be 0.71 dl/g by measuring with concentration of 0.5 g/dl at 30° C. in m-cresol.

Anal. Calcd: C,74.02; H,3.64; N,5.42. Found: C,73.92; H,3.64; N,5.42

Characteristics of PEII/PEI copolymer manufactured by the foregoing above examples, are as follows.

COMPARATIVE EXAMPLE 1

The general procedure of example 1 is repeated except that 7.9 parts of BEA, 6.05 parts of B-4-APIB were used to obtain a homopolymer, PEII.

The yield was quantitative and the inherent viscosity was found to be 0.55 dl/g by measuring with concentration of 0.5 g/dl at 30° C. in m-cresol.

COMPARATIVE EXAMPLE 2

The general procedure of example 1 is repeated except that 7.9 parts of BEA, 1.67 parts of m-PD were used to obtain a homopolymer, PEI.

The yield was quantitative and the inherent viscosity was found to be 0.51 dl/g by measuring with concentration of 0.5 g/dl at 30° C. in m-cresol.

Properties of copolymer according to above examples are as given in the following table 1.

HDT of copolymer which is shown in the range from 207° to 247° C. was measured by ASTM-D647.

As we can know from table 1, the heat resistance of copolymer is highly improved, compared with that of PEI.

This is explained that as the weight ratio of EII in copolymer increase, molecular stiffness increases.

The melt viscosities of the copolymers were measures by a Rheometrics Dynamic Spectrometer (RDS) to determine the processability of the copolymers according to the present invention. The evaluation results are shown in Table 1. The determination of the melt viscosity of the copolymer was carried out as follows; At first, the copolymer in a powder state was heat-pressed to give a parallel plate (diameter:25 mm, thickness: 2 mm). After heating the sample plate to 330° C., the melt viscosity of the copolymer was measured at the same temperature while the frequency was changed through a range of 10-1 to 103 rad/sec.

Strain was fixed at 10%. As shown in Table 1, as the amount of the imide moiety from m-phenylenediamine is copolymer increases, the melt viscosity comes nearer to 3.1×104 poise, which is melt viscosity of PEI. Judging from the fact that the melt viscosity of PEII is 1.6×105 poise, melt viscosity of copolymer is decreased to 6.0×104 poise if the amount of polyetherimide moiety is only 30% and consequently its melt processability is increased. Further to this, in order to examine the changes of melt viscosity accorded from the temperature increase, the melt viscosity of the said sample is measured at 290°~380° C. under 1 Hz and 10% strain and its results are shown in FIG. 1.

Seen from the FIG. 1, the decrease rate of melt viscosity of copolymers according to temperature increase is great and the melt viscosity is much lowered as compared with that of PEII under the same condition. This explained that the novel copolymer have good processability. Therefore, by adding PEI moiety in main chain of PEII resin the novel copolymer was much improved in its heat resistance than PEI and in its good processability than PEII.

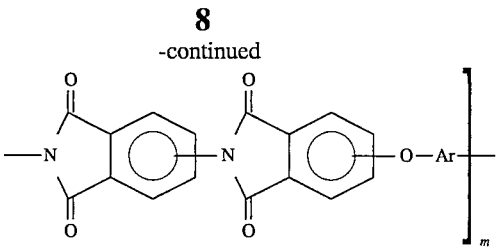

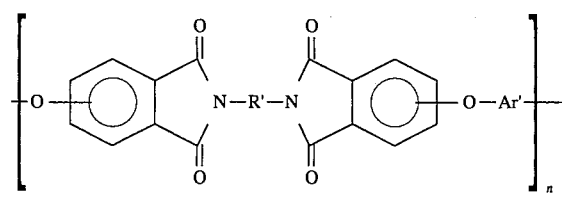

wherein,

TABLE 1

| classification | copolymer | GPC[3] number average molecular weight | GPC[3] weight average molecular weight (Mw) | $T_g$[4] (°C.) | HDT[5] (°C.) | DT[6] (°C.) | viscosity[7] [η inh] | Tensile strength[8] (N/mm²) | MV[9] (Poise) |
|---|---|---|---|---|---|---|---|---|---|
| Example 1 | EII/EI(10:90) | 23,700 | 83,200 | 225 | 208 | 551 | 0.84 | 117 | 3.5 × 10⁴ |
| Example 2 | EII/EI(30:70) | 22,300 | 80,200 | 228 | 211 | 553 | 0.78 | 122 | 4.2 × 10⁴ |
| Example 3 | EII/EI(50:50) | 20,600 | 77,400 | 233 | 215 | 554 | 0.73 | 125 | 5.2 × 10⁴ |
| Example 4 | EII/EI(70:30) | 21,200 | 79,900 | 240 | 221 | 555 | 0.76 | 126 | 6.0 × 10⁴ |
| Example 5 | EII/EI(90:10) | 21,100 | 78,600 | 243 | 225 | 560 | 0.70 | 130 | 8.5 × 10⁴ |
| Example 6 | EII/EI-6(50:50) | 25,100 | 81,200 | 224 | 207 | 545 | 0.67 | 119 | 4.0 × 10⁴ |
| Example 7 | EII/EI-7(50:50) | 21,000 | 72,400 | 255 | 247 | 550 | 0.71 | 122 | 5.8 × 10⁴ |
| Comp. example 1[1] | PEII | 9,200 | 41,100 | 243 | 225 | 520 | 0.55 | 101 | 1.6 × 10⁵ |
| Comp. example 2[2] | PEI | 20,000 | 53,000 | 217 | 200 | 535 | 0.51 | 100 | 3.1 × 10⁴ |

[1]polyetherimideimide resin
[2]polyetherimide resin
[3]Gel permeation chromatography
[4]Glass transition Temperature
[5]Heat Deflection Temperature (ASTM D-647)
[6]Initial Decomposition Temperature
[7]Concentration of 0.5 g/dl at 30° C. in m-cresol
[8]ASTM D-1708 (Film casting method)
[9]Melt viscosity measured by Rheometrics Dynamic Spectrometer (RDS) at 330° C., 10% strain, 10⁻¹ Hz

We claim:

1. A copolymer of etherimideimide/etherimide with the following structural formula (I)

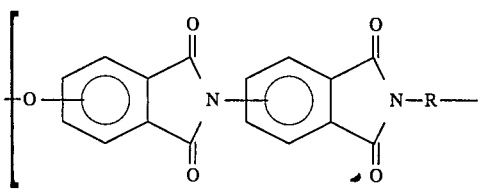
(I)

R and R' are independently selected from the groups of

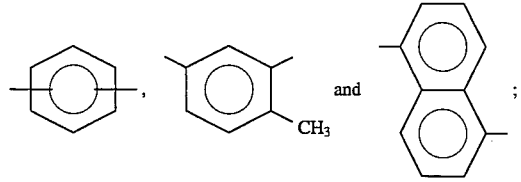

Ar and Ar' are independently selected from the groups of

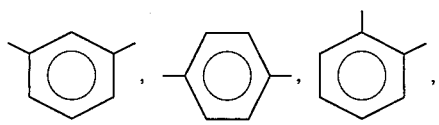

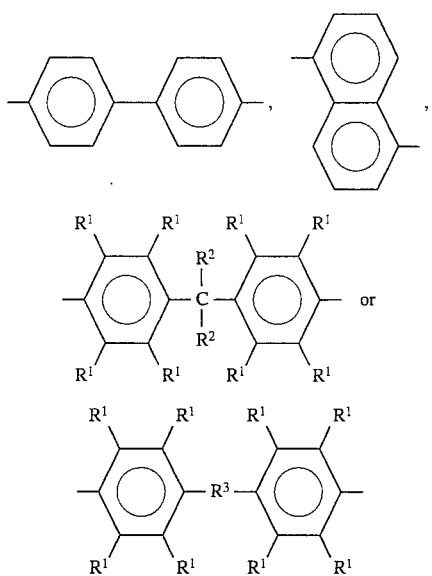

(wherein,

R1 is H or C1~C6 alkyl group,

R2 is H or C1~C4 alkyl group, and

R3 is —O—, —CO—, —SO—, —SO2—); and n and m are independently an integer between 5 and 500.

2. The method for preparing copolymer as defined in the claim 1, which has melt viscosity of 0.67~0.84 dL/g in condition of 0.5 g/dL in m-cresol at 30° C.

3. The copolymers as defined in the formula (I) of claim 1, which has glass transition temperatures (Tg's) of 224°~255° C. and tensile strength of 117–130 N/mm2.

4. The copolymers as defined in claims 1, which has melt viscosity of 8.5×104~3.5×104 poise under 330° C., 10% strain and frequency of 10–1 rad/sec.

* * * * *